United States Patent [19]

Gaut

[11] Patent Number: 5,259,706
[45] Date of Patent: Nov. 9, 1993

[54] THREAD REPAIRING TOOLS

[76] Inventor: Eugene Gaut, 4605 Merrydale Ave., Dayton, Ohio 45431

[21] Appl. No.: 937,137

[22] Filed: Aug. 31, 1992

[51] Int. Cl.⁵ .......................... B23G 47/34; B23G 5/06
[52] U.S. Cl. ..................... 408/1 R; 408/150; 408/188; 408/222; 470/198; 470/209
[58] Field of Search ................. 470/198, 209; 408/150, 408/151, 187, 188, 215, 1 R, 67, 222; 29/402.05, 402.06

[56] References Cited

U.S. PATENT DOCUMENTS

| | | |
|---|---|---|
| 1,196,415 | 8/1916 | Abrahamson . |
| 2,212,753 | 8/1940 | Smila et al. . |
| 2,413,406 | 12/1946 | Dooling ........................... 408/150 |
| 2,948,000 | 8/1980 | Borland . |
| 3,694,838 | 10/1972 | Runton . |
| 3,750,259 | 8/1973 | Timmons . |
| 3,847,499 | 11/1974 | Heyworth et al. . |
| 3,864,806 | 2/1975 | Hanson et al. . |
| 4,466,762 | 8/1984 | Menke ............................ 408/222 |
| 4,539,832 | 9/1985 | Koller ............................ 72/118 |

*Primary Examiner*—Steven C. Bishop
*Attorney, Agent, or Firm*—Ralph L. Marzocco

[57] ABSTRACT

A threading tool for repairing, in situ, threads within a bore of a head of an internal combustion engine without the danger of particulate waste falling into the engine housing. The threading tool can be used separately or in combination with a reaming tool for deburring, in situ, rough edges generally at the crest of threads within a bore of a head of an internal combustion engine without the danger of particulate waste falling into the engine housing.

12 Claims, 2 Drawing Sheets

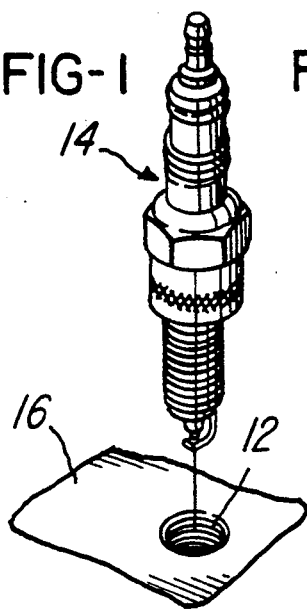
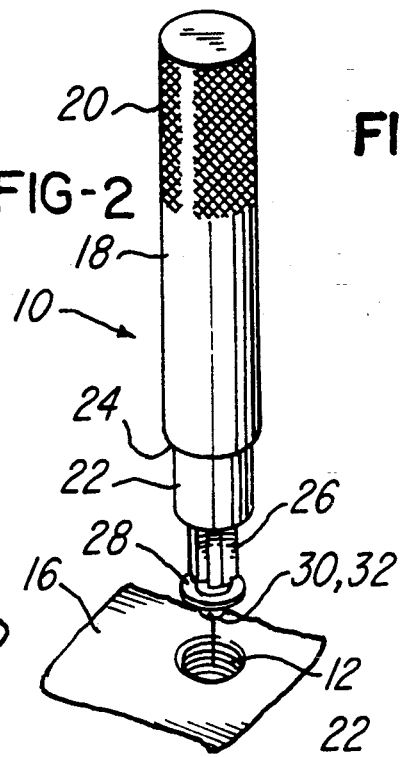
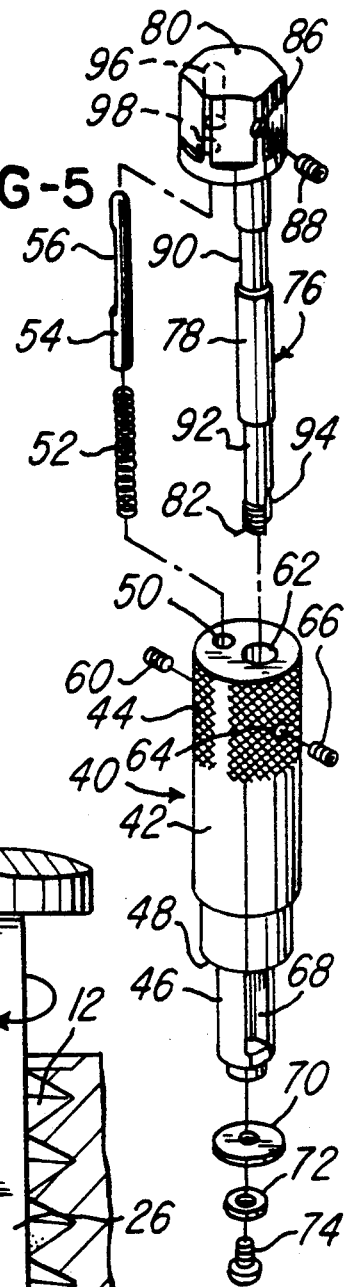
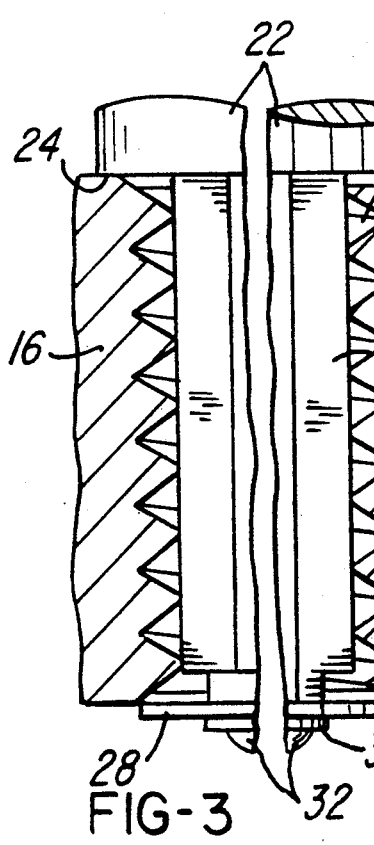
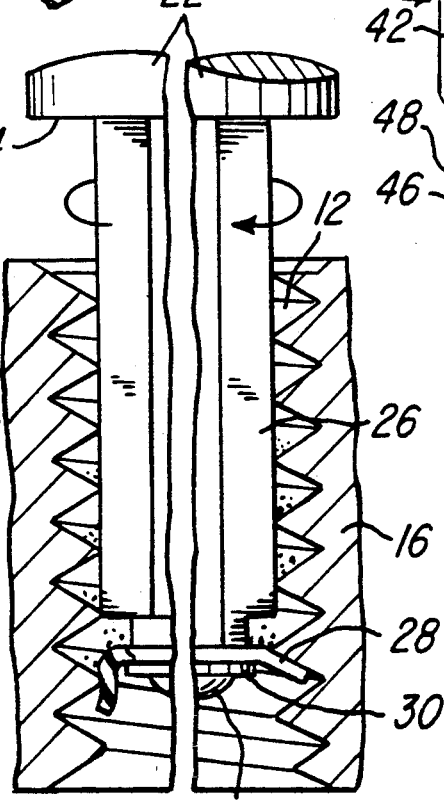

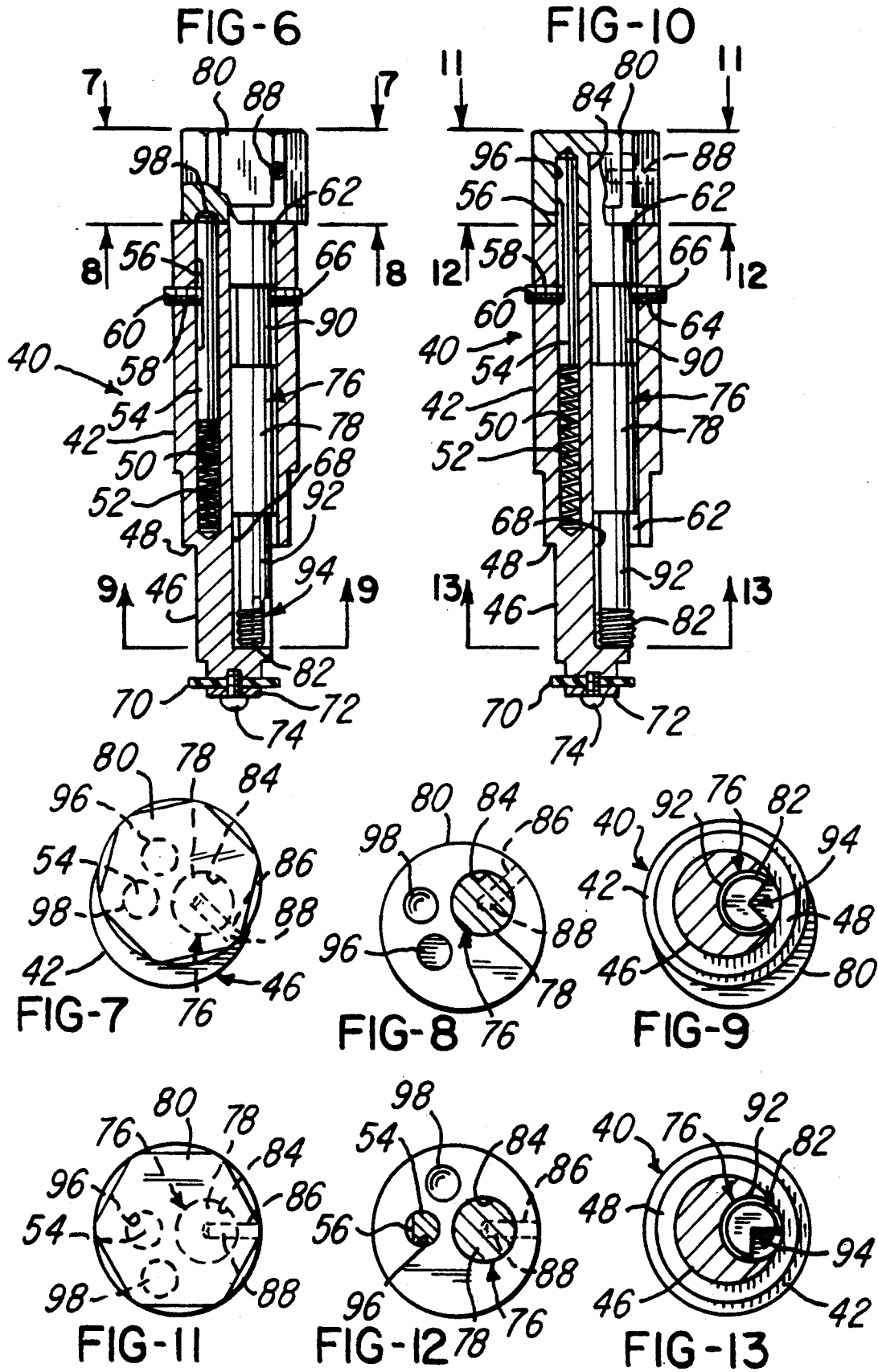

THREAD REPAIRING TOOLS

BACKGROUND OF THE INVENTION

1. Field of the Invention

The present invention generally relates to a tool and a method for repairing the threads within a bore. More particularly, the invention relates to a tool and a method for repairing the threads within a bore of the head of an internal combustion engine without the danger of metallic particulates and combustion by-products falling into the engine housing.

2. Description of the Prior Art

According to the teachings of the prior art, one problem which is being encountered with servicing automobiles can be attributed to the manufacture of contemporaneous internal combustion engines from soft materials such as aluminum and the like. Spark plugs used by these engines tend to destroy spark plug openings when the hard metal thread of a spark plug has burrs on it or is cross threaded and by the repeated insertion and removal of a spark plug especially if tightened too securely.

The problem can be remedied in several ways such as removing the engine head, boring out the spark plug openings, rethreading the openings, and replacing the spark plug with a larger diameter spark plug or with an insert to reduce the threaded openings to the proper size. However, such procedure can be financially burdensome to the automobile owner.

Alternatively, a procedure in which the engine head is not removed, encounters the possibility that metallic particulates could remain within the cylinder to become caught between valves and their seats causing burned valves. Furthermore, metallic particulates in the cylinders of an internal combustion engine could readily cause numerous other problems if such particulates become wedged between the pistons and cylinders during the reciprocation process.

Representative of the prior patent art directed at this problem are U.S. Pat. Nos. 1,196,415 (Abrahmson); 2,212,753 (Smila et al.); 2,948,000 (Borland); 3,694,838 (Runton); 3,750,259 (Timmons); 3,847,499 (Heyworth et al.); 3,864,806 (Hanson et al.); and 4,539,832 (Koller).

Of general interest are U.S. Pat. No. 1,196,415 which discloses an implement for truing-up threads particularly the valve and cap threads of nipples of pneumatic tires; U.S. Pat. No. 2,212,753 which discloses a reaming tool for boring holes of relatively great depth; U.S. Pat. 3,864,806 which discloses a method for repairing stripped spark plug threads in engine heads; and U.S. Pat. No. 4,539,832 which discloses a hole sizing tool to push malleable material from the walls of an oversized hole toward the axis of the hole to reduce the effective diameter of the hole.

Of particular interest are U.S. Pat. Nos. 2,948,000; 3,694,838; 3,750,259; and 3,847,499. U.S. Pat. No. 2,948,000 discloses a combination tapped hole and seat refinishing tool comprising an enlarged head mounted at the upper end of a shank with a wider lower portion, means integral with the lower portion of the shank for cleaning a tapped hole, and means slidably mounted on the shank for scraping the seat around the hole. The lower tip of the shank forms an unthreaded pilot and the scraping means includes a collar slidably mounted on the shank. The collar has a vertical keyway, a pin mounted transversely through the shank and extending into the keyway. The collar also has cutting teeth on its bottom edge, a coil spring surrounding the upper end of the shank, and a lower stop means.

U.S. Pat. No. 3,694,838 discloses a rotary tool for reworking spark plug ports of soft metal cylinder heads comprising a handle part and a working part. The handle part has an internally threaded bore adapted to engage the entering end of the working part after the working part has penetrated through the cylinder head. The working part has a first and second reamer section of smaller and larger diameter followed by a tapered lead-in section, a tapping section, and a third reamer section for producing a countersink at the mouth of the spark plug port to receive the head flange of a hard metal insert.

U.S. Pat. No. 3,750,259 discloses an assemblage of components for repairing the threads of a through bore comprising a reamer tool with a pilot end portion for forming an oversize bore and with a tail portion for forming a counterbore at the outer end of the over-size bore. Further comprising a right hand threaded tap for forming right hand threads in the over-size bore, a right hand threaded shank engageable in an inside and outside right hand threaded sleeve-type insert, and a threaded nut-type flaring tool for flaring the first inserted end of the sleeve insert in the corresponding end of the threaded over-size bore.

U.S. Pat. No. 3,847,499 discloses a tool for preparing a damaged opening in a rotary engine housing to receive a threaded insert comprising an alignment block, a securing bolt, a guide pin, and reamer and tap assemblies. The alignment block has a first and second opening for alignment with undamaged and damaged spark plug openings in communication with a common combustion chamber. The securing bolt clamps the alignment block to the housing and has air conduit means for communication of the combustion chamber. The reamer and tap assemblies are receivable by the alignment block opening.

SUMMARY OF THE INVENTION

The threading tool of the present invention may be used for repairing threads within a bore of a head of an internal combustion engine without removing the head from the engine. Such repair may be accomplished without the danger of particulate waste falling into the engine housing.

In accordance with the teachings of the present invention the threading tool has a generally cylindrical-shaped body with a knurled section at one end and a reduced section at the other end. A first off-center bore extends from the end of the knurled section to approximately one-half the length of the threading tool body for housing a plunger pin and a plunger pin spring capable of reciprocal movement. A second off-center bore extends from the end of the knurled section to approximately the end of the reduced section and describes a slotted opening at the reduced section of the threading tool body. A particulate retaining element is attached at the end of the reduced section of the threading tool body. A generally cylindrical-shaped thread cutting member is slidably and rotatably movable in the second bore of the threading tool body. The thread cutting member has a generally hexagonal-shaped head element at one end for rotatably driving the thread cutting member and an intermittent, spiral-shaped thread cutter element with the intermittent portion describing a generally pie-shaped space at the other end. A first head element bore when in spatial alignment with the first bore and the reciprocally movable plunger pin of the threading tool body positions the thread cutter element in the thread cutting mode. A second head element bore of the threading tool body has means for securing one end of the thread cutting element to the head element. An arcuate indent in the base of the head element proximate to and in circular alignment with the first head element bore positions the thread cutting element in the nonthread cutting mode.

Whenever threads of a tapped hole are damaged and require repair, the threading tool in the open position (nonthread cutting mode) is inserted into the damaged tapped hole sufficiently deep so that the flexible retainer is disposed beyond the damaged threads. The hexagonal-shaped head is rotated to the closed position (thread cutting mode) causing the thread cutter to threadably engage the threads of the tapped hole. The threading tool is then outwardly rotated toward the open end of the tapped hole and in the process the particulates that are cut away are retained by the flexible retainer and safely discarded when the threading tool is removed from the repaired tapped hole.

The reaming tool of the present invention may be used for removing rough edges, burrs, and the like at the crest of damaged threads within a bore of a head of an internal combustion engine. Such repair may be accomplished without the danger of particulate waste falling into the engine housing.

In accordance with the teachings of the present invention the reaming tool has a generally cylindrical-shaped body with a knurled section at one end and a reduced section at the other end. The reduced section defines a shoulder stop for limiting the distance the reaming tool may be inserted into a damaged tapped hole. An elongated reamer cutter, whose diameter is equal to the crest diameter of a damaged tapped hole, is machined from the reduced section. A particulate retaining element is attached at the end of the reduced section of the reaming tool body.

Whenever the outermost portion of a tapped hole is damaged and requires repair, the reaming tool cutter section is inserted into the tapped hole until the shoulder stop contacts the cylinder head at which time the particulate retainer is disposed somewhat beyond the bottommost thread of the tapped hole. The outwardly rotation of the reaming tool causes the reamer cutter to cut away all particulates affixed to the crest of damaged threads. The cut away particulates are prevented from dropping out of the bottom of the tapped hole by the particulate retainer and are discarded after the reaming tool is disengaged from the repaired tapped hole.

BRIEF DESCRIPTION OF THE DRAWINGS

For a further understanding of the nature and object of the invention, reference should be had to the detailed description of the exemplary embodiment taken in connection with the appended drawings in which:

FIG. 1 is a perspective view of a sparkplug for threadably engaging a bore of partially shown head of an internal combustion engine.

FIG. 2 is a perspective view of a reaming tool of this invention for deburring damaged threads of a bore of a partially shown head of an internal combustion engine.

FIG. 3 is a sectional view of a reaming tool of this invention showing an elongated cutter thereof fully inserted within a bore of a partially shown head of an internal combustion engine.

FIG. 4 is a sectional view of a reaming tool of this invention showing an elongated cutter thereof in the process of deburring damaged threads of a bore of a partially shown head of an internal combustion engine.

FIG. 5 is an exploded perspective view of a threading tool of this invention.

FIG. 6 is an elevational, partially sectional view of the threading tool of FIG. 5 showing the thread cutters thereof in a nonthread engaging position.

FIG. 7 is a sectional view on line 7—7 of FIG. 6.

FIG. 8 is a sectional view of line 8—8 of FIG. 6.

FIG. 9 a sectional view on line 9—9 of FIG. 6.

FIG. 10 is an elevational, partially sectional view of the threading tool of FIG. 5 showing the thread cutters thereof in a thread engaging position.

FIG. 11 is a sectional view on line 11—11 of FIG. 10.

FIG. 12 is a sectional view on line 12—12 of FIG. 10.

FIG. 13 is a sectional view on line 13—13 of FIG. 10.

DESCRIPTION OF THE PREFERRED EMBODIMENT

In the following description of the preferred embodiment, like reference characters designate like or corresponding parts throughout the several views of the drawings. Additionally, such terms as "forward", "rearward", "left", "right", "upwardly", "downwardly", and the like, are words of convenience and are not to be construed as limiting terms.

Although the preferred embodiment hereof is detailed and exact to enable those skilled in the art to practice the invention, such embodiment merely exemplifies the invention which may be embodied in other specific structures. While the best known embodiment has been described, it is to be understood the details may be changed without departing from the spirit and scope of the invention which is defined by the claims.

Referring now to the drawings, and particularly to FIG. 2, there is illustrated a reaming tool, generally designated by the numeral 10, for use in removing rough edges, burrs, and the like at the crest of threads of damaged tapped holes. For example, a tapped hole 12 for a sparkplug 14, such as is illustrated in FIG. 1 of many internal combustion engines currently in use that are provided with a cylinder head 16 (partially shown) of relatively soft metal such as aluminum, can become burred or cross threaded by harder metal threads. The softer metal threads may be damaged to the extent that leakage may result causing loss of compression.

Reaming tool 10 defines a generally cylindrical-shaped reaming tool body 18 having a knurled section 20 at one end and a reduced section 22 at the other end. Produced by a diametric reduction of one end of reaming tool body 18, reduced section 22 perforce forms a shoulder stop 24 for limiting the distance reaming tool 10 may be inserted into a damaged tapped hole and has an elongated reamer cutter 26 machined from reduced section 22 so that the diameter of reamer cutter 26 is equal to the crest diameter of tapped hole 12.

Reaming tool body 18 at the end of reduced section 22 has attached a flexible particulate retainer 28 (such as an elastomeric washer) whose diameter is somewhat larger than the concentric diameter of reamer cutter 26. Means for attaching particulate retainer 28 to the end portion of reduced section 22 include a nonflexible backing piece 30 (such as a metallic washer) whose diameter is somewhat smaller than the concentric diameter of particulate retainer 28 and a fastener 32 (such as a screw).

To deburr damaged tapped holes, the portion of reduced section 22 with reamer cutter 26 is inserted into tapped hole 12 until shoulder stop 24 contacts cylinder head 16 with particulate retainer 28 being somewhat beyond the bottommost thread of tapped hole 12 as shown in FIG. 3. As reaming tool 10 is twisted out of tapped hole 12, as shown in FIG. 4, reamer cutter 26 cuts away any rough edges, burrs, and the like primarily at the crest of damaged threads. Particulates of cut away metal are prevented from dropping out of the bottommost portion of tapped hole 12 by thread follower, particulate retainer 28, and are discarded after reaming tool 10 is disengaged from tapped hole 12.

Referring again to the drawings, and particularly to FIGS. 5, 6, and 10, there is illustrated a threading tool, generally designated by the numeral 40, for use in repairing damaged threads of tapped holes. Threading tool 40 defines a generally cylindrical-shaped threading tool body 42 having a knurled section 44 at one end and a reduced section 46 at the other end. Produced by a diametric reduction of one end of threading tool body 42, reduced section 46 perforce forms a shoulder stop 48 for limiting the distance threading tool 40 may be inserted into a damaged tapped hole.

Threading tool body 42 has a first, smaller diameter, off-center bore 50 extending from the end of knurled section 44 to a bottom approximately one-half the length of threading tool body 42. First bore 50 houses a coil spring 52 and a plunger pin 54. Plunger pin 54 which is generally cylindrical-shaped has an elongated indent 56 that cooperates with means described below to restrict the amount of travel of plunger pin 54 and to retain a portion of plunger pin 54 within first bore 50.

Communicably extending from the outer circumferential wall of threading tool body 42 to first bore 50 is a plunger pin threaded bore 58. Within threaded bore 58 is a plunger pin bore screw 60 that cooperates with indent 56 for slidably retaining plunger pin 54 in first bore 50.

A larger diameter, off-center, second bore 62 of threading tool body 42 extends from end of knurled section 44 approximately to the end of reduced section 46. Communicably extending from the outer circumferential wall of threading tool body 42 and diametrically opposite plunger pin threaded bore 58 is a third threaded bore 64 of threading tool body 42. Within third threaded bore 64 is a third threaded bore screw 66 whose function is described below. A slotted opening 68 is machined into the downward portion of off-center bore 62 extending from shoulder 48 to near the bottom of reduced section 46.

Threading tool body 42 at the end of reduced section 46 has attached a flexible particulate retainer 70 (such as an elastomeric washer) whose diameter is somewhat larger than the concentric diameter of the downward portion of reduced section 46. Means for attaching particulate retainer 70 to the end portion of reduced section 46 include a nonflexible backing piece 72 (such as a metallic washer) whose diameter is somewhat smaller than the concentric diameter of particulate retainer 70 and a fastener 74 (such as a screw).

A thread cutting member 76, which is slidably and rotatably coupled to threading tool body 42 and which is partially housed within second bore 62 of threading tool body 42, comprises an elongated cylindrical element 78 with a hexagonal-shaped head 80 at one end for rotatably driving cylindrical element 78 and with a thread cutter 82 at other end. Hexagonal-shaped head 80 contains a second head bore 84 that is in spatial alignment with second bore 62 of threading tool body 42. A thread cutting member 76 is releasably affixed to hexagonal-shaped head 80 by means of a threaded third head bore 86 perpendicular to thread cutting member 76 and communicably extending from the outer wall of hexagonal-shaped head 80 to second head bore 84 therethrough to a spatially aligned, threaded first cylindrical element bore (not shown) and a threaded head fastener 88.

Additionally, cylindrical element 78 of thread cutting member 76 comprises an elongated first circular indent 90 located proximate to hexagonal-shaped head 80 and an elongated second circular indent 92 located proximate to thread cutter 82. First circular indent 90 is used in conjunction with threaded third bore 64 and threaded third bore screw 66 of threading tool body 42 for slidably and rotatably retaining cylindrical element within threading tool body 42. Second circular indent 92 provides a recess from the outer portion of thread cutter 82 so as to not interfere with the thread cutting process and to provide a temporary depository of particulate waste.

Thread cutter 82 at the opposite end of cylindrical element 78 from hexagonal-shaped head 80 intermittently helically spirals approximately three-fourths of the circumference of cylindrical element 78 and axially extends from second circular indent 92 to end of cylindrical element 78. In use, the crests and roots of thread cutter 82 threadably engage tapped hole 12.

The intermittent helical spirals of thread cutter 82 is caused by a pie-shaped indent 94 extending approximately one-fourth of the circumference of cylindrical element 78 and extending the entire axial length of thread cutter 82. In use, the crests and roots of thread cutter 82 do not threadably engage tapped hole 12 when pie-shaped indent 94 is properly positioned.

Hexagonal-shaped head 80 has a first head bore 96 spatially alignable with first bore 50 of threading tool body 42 that extends from the base of hexagonal-shaped head 80 to a place approximately one-half of the height of hexagonal-shaped head 80. Additionally, in the base of hexagonal-shaped head 80 is a dimple-like indent 98 in circular alignment with first head bore 96 and plunger pin 54.

Referring again to the drawings, and particularly to FIGS. 6-9, threading tool 40 is illustrated in an open, nonthread engaging position whereby pie-shaped indent 94 is disposed opposite to the threads of tapped hole 12. To achieve this position, hexagonal-shaped head 80 is rotated until plunger pin 54 is secured in dimplelike indent 98.

Referring once again to the drawings, and particularly to FIGS. 10-13, threading tool 40 is illustrated in a closed, thread engaging position whereby thread cutter 82 is disposed opposite to the threads of tapped hole 12. To achieve this position, hexagonal-shaped head 80 is rotated until plunger pin 54 is secured in first head bore 96.

In use, whenever threads of tapped hole 12 are damaged and require repair, threading tool 40, in the open position, is inserted into tapped hole 12 so that flexible retainer 70 is disposed beyond the damaged threads. Hexagonal-shaped head 80 is then rotated to the closed position whereby thread cutter 82 threadably engages the threads of tapped hole 12. The particulates that are cut away are retained by flexible particulate retainer 70 as it rotates toward the open end of taped hole 12.

Occasionally, an operator may only use reaming tool 10 to remove rough edges, burrs, and the like from the crest of threads of a tapped hole. On the other hand, if he determines, after using reaming tool 10, that the tapped hole also needs to be rethreaded, he would use threading tool 40. Thus, reaming tool 10 may be used without the use of threading tool 40 or reaming tool 10 may be used in conjunction with threading tool 40.

Although the preferred embodiment of the device has been described, it will be understood that within the purview of this invention various changes may be made in the form, detail, proportion, and arrangement of parts, the combination thereof and mode of operation, which generally stated consist in a device capable of carrying out the objects set forth, as disclosed and defined in the appended claims.

What is claimed:

1. A threading tool for repairing threads within a bore, which comprises:
    a generally cylindrical-shaped threading tool body at one end having a knurled section and at the other end having a reduced section;
    a particulate retainer attached to the end portion of the reduced section of the threading tool body;
    a first off-center bore extending from the end of the knurled section to approximately one-half the length of the threading tool body for housing a plunger pin and a plunger pin spring;
    means for allowing reciprocal movement of the plunger pin and the plunger pin spring;
    a second off-center bore extending from the end of the knurled section to approximately the end of the reduced section and describing a slotted opening at the reduced section of the threading tool body;
    a generally cylindrical-shaped thread cutting member slidably and rotatably movable in the second bore of the threading tool body;
    a generally hexagonal-shaped threading tool head releasably attached to one end of the thread cutting member for rotatably driving the thread cutting member;
    a threading tool head bore in spatial alignment with the first off-center bore and the reciprocally movable plunger pin of the threading tool body for positioning the thread cutting member in a thread cutting mode; and
    a dimple-like indent in a base of the generally hexagonal-shaped threading tool head for positioning the thread cutting member in a nonthread cutting mode.

2. A threading tool for repairing threads within a bore according to claim 1, wherein the reduced section is produced by a diametric reduction at said other end of the threading tool body.

3. A threading tool for repairing threads within a bore according to claim 2, wherein the diametric reduction at said one end of said threading tool body perforce forms a shoulder for limiting the distance said threading tool body may be inserted into a damaged tapped hole.

4. A threading tool for repairing threads within a bore according to claim 1, wherein the particulate retainer comprises a flexible elastomeric washer-like piece, whose diameter is somewhat larger than the diameter of the adjacent reduced section, and is attached to the reduced section by means of a nonflexible washer-like backing piece, whose diameter is somewhat smaller than the diameter of the flexible particulate retainer, and a screw-like fastener.

5. A threading tool for repairing threads within a bore according to claim 1, wherein the thread cutting member at another end describes an intermittent, spiral-shaped cutter with an intermittent portion describing a generally pie-shaped space.

6. A threading tool for repairing threads within a bore according to claim 5, wherein the generally hexagonal-shaped threading tool head has a nonthread engaging position whereby the pie-shaped space is disposed opposite to the threads of a tapped hole and has a thread engaging position whereby the spiral-shaped cutter is disposed opposite to the threads of a tapped hole.

7. A threading tool for repairing threads within a bore according to claim 1, wherein the threading tool head bore extends from the base of the hexagonal-shaped head to a place approximately one-half the height of the hexagonal-shaped head.

8. A threading tool for repairing threads within a bore according to claim 1, wherein the dimple-like indent is in circular alignment with the threading tool head bore.

9. A threading tool for repairing threads within a bore according to claim 1, wherein the means for allowing reciprocal movement of the plunger pin and the plunger pin spring within the first off-center bore utilizes an elongated indent on the generally cylindrical-shaped plunger pin and a plunger pin bore screw perpendicularly disposed thereto.

10. A method for repairing threads within a bore using a threading tool having a generally cylindrical-shaped threading tool body at one end having a knurled section and at the other end having a reduced section; a particulate retainer attached to the end portion of the reduced section of the threading tool body; a first off-center bore extending from the end of the knurled section to approximately one-half the length of the threading body for housing a plunger pin and a plunger pin spring; means for allowing reciprocal movement of the plunger pin and the plunger pin spring; a second off-center bore extending from the end of the knurled section to approximately the end of the reduced section and describing a slotted opening at the reduced section of the threading tool body; a generally cylindrical-shaped thread cutting member is slidably and rotatably movable in the second bore of the threading tool body; a generally hexagonal-shaped threading tool head releasably attached to one end of the thread cutting member for rotatably driving the thread cutting member; a threading tool head bore in spatial alignment with the first off-center bore and the reciprocally movable plunger pin of the threading tool body for positioning the thread cutting member in the thread cutting mode; and a dimple-like indent in the base of the generally hexagonal-shaped threading tool head for positioning the thread cutting member in the nonthread cutting mode; which comprises:
    turning the hexagonal-shaped head of the threading tool to the nonthreading position whereby the thread cutter does not threadably engage the damaged threads of the tapped hole;
    inserting the reduced section of the threading tool body into the tapped hole so that the flexible retainer is disposed beyond the damaged threads;
    turning the hexagonal-shaped head of the threading tool to the threading position whereby the thread cutter threadably engages the damaged threads of the tapped hole; and rotating the threading tool outwardly of the tapped hole causing rethreading of the damaged threads with the resulting particulates being retained by the flexible retainer.

11. A method for removing rough edges, burrs, and the like at the crests of threads of damaged tapped holes using a reaming tool having a generally cylindrical-shaped reaming tool body at one end having a knurled section and at the other end having a reduced section, said reduced section defining a shoulder stop for limiting the distance the reaming tool may be inserted into the damaged tapped holes; an elongated reamer cutter machined from the reduced section so that the diameter of the reamer cutter is equal to the crest diameter of the damaged tapped holes; and a particulate retainer attached to the end portion of the reduced section of the reaming tool body, which comprises:

inserting the reduced section of the reaming tool body into the tapped hole so that the flexible retainer is disposed beyond the damaged threads; and rotating the reaming tool outwardly of the tapped hole causing remaining of the tapped hole with the resulting particulates being retained by the flexible retainer.

12. A reaming tool for removing rough edges, burrs, and the like at the crests of threads of damaged tapped holes, which comprises:

a generally cylindrical-shaped reaming tool body at one end having a knurled section and at the other end having a reduced section, said reduced section defining a shoulder stop for limiting the distance the reaming tool may be inserted into the damaged tapped holes;

an elongated reamer cutter machined from the reduced section so that the diameter of the reamer cutter is equal to the crest diameter of the damaged tapped holes; and a particulate retainer attached to the end portion of the reduced section of the reaming tool body.

* * * * *

UNITED STATES PATENT AND TRADEMARK OFFICE
CERTIFICATE OF CORRECTION

PATENT NO. : 5,259,706
DATED : November 9, 1993
INVENTOR(S) : Eugene Gant

It is certified that error appears in the above-indentified patent and that said Letters Patent is hereby corrected as shown below:

On the title page:

Items [19] and [76]          change "Gaut" to - - Gant - - .

Signed and Sealed this

Twenty-sixth Day of July, 1994

Attest:

BRUCE LEHMAN

*Attesting Officer*      *Commissioner of Patents and Trademarks*